Oct. 30, 1962     R. J. GRAY ETAL     3,061,344
BALL JOINT, AND SECURING AND DUST SHIELD MEANS THEREFOR
Filed June 21, 1960
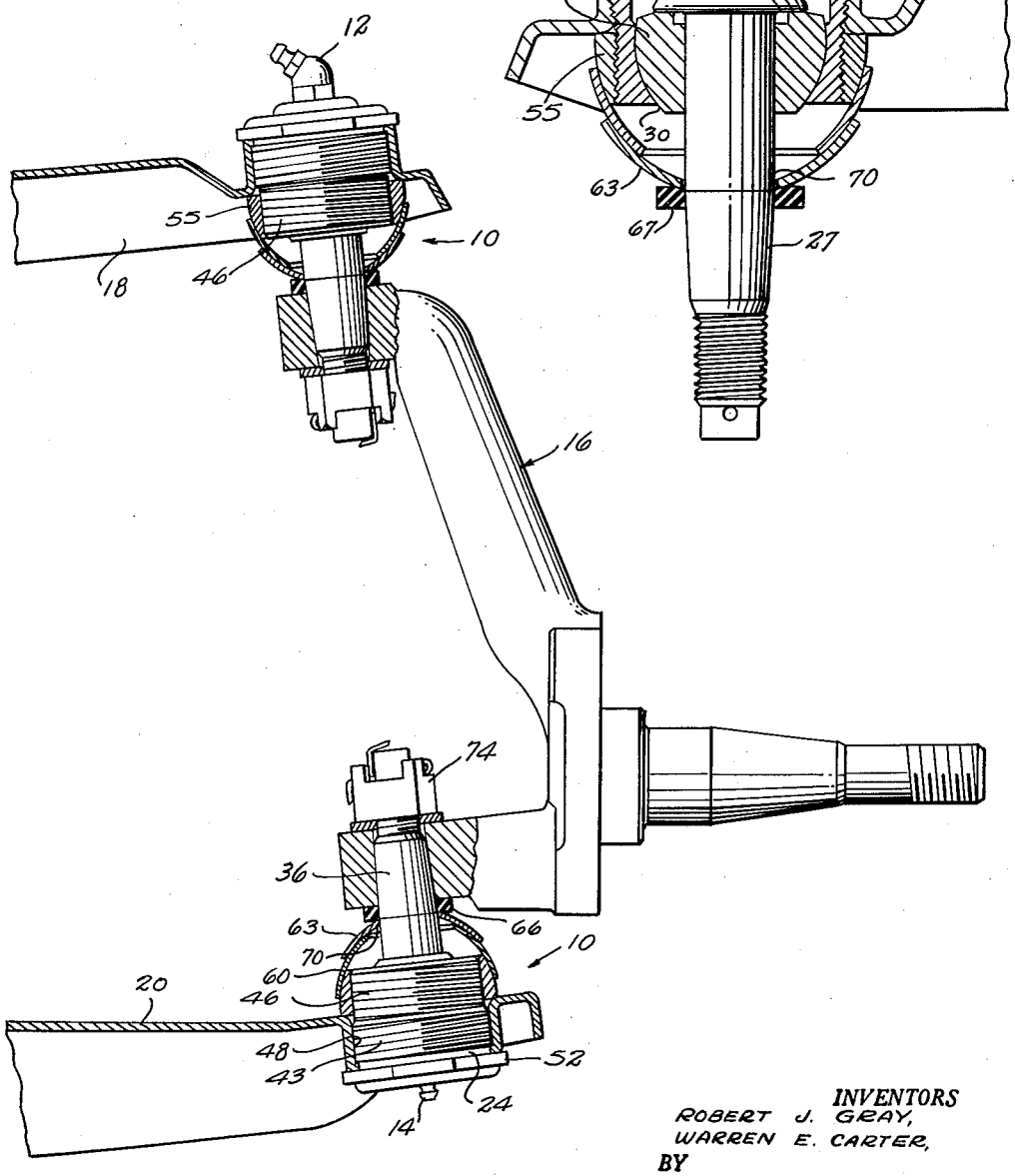
INVENTORS
ROBERT J. GRAY,
WARREN E. CARTER,
BY
Albert M. Zalkind
ATTORNEY.

United States Patent Office 3,061,344
Patented Oct. 30, 1962

3,061,344
BALL JOINT, AND SECURING AND DUST
SHIELD MEANS THEREFOR
Robert J. Gray and Warren E. Carter, Fairfield, Ill., assignors to Airtex Products, Inc., Fairfield, Ill.
Filed June 21, 1960, Ser. No. 37,689
5 Claims. (Cl. 287—87)

This invention relates to ball joints and more particularly to a ball joint used for front suspensions of automobiles.

It is an object of the invention to provide a ball joint particularly suited for use as replacement on the steering control arms of the front suspension.

It is another object of the invention to provide a ball joint which can be substituted for a worn joint and which will hold securely in place despite loose and worn threads with which it normally would co-act for support in the steering control arms.

It is a further object of the invention to provide a ball joint having a unique dust shield which will serve its purpose effectively despite any degree of torsion, twist, or rocking of the joint intermediate the parts which it connects.

It is an even further object of the invention to provide a ball joint wherein the several features co-act with each other to produce a unified effect insofar as secure holding and dust shielding are concerned.

Other objects and features of the invention will be apparent from the detailed description to follow.

Briefly, our invention overcomes certain drawbacks of the prior art wherein replacement ball joints are threaded into the steering control arms of a vehicle for retention by threads in the arm, that have been worn. Thus, when a new car is built, the ball joint housing is threaded into an aperture in the arm and is provided with an external right-hand thread which cuts the complementary thread in the aperture of the arm. This is quite suitable and forms a fairly tight joint, in normal practice, which has reasonably good holding qualities. However, when the ball joint becomes worn and must be replaced, it is removed and replaced with a ball joint which is then screwed into the aperture engaging the same threads initially cut by the ball joint which it replaces. Such threads may normally be expected to have become worn or enlarged during the course of use by the constant twisting stresses on the ball joint. Accordingly, when the replacement ball joint is screwed into place, there is danger of its not seating with tight, threaded rigidity. In order to overcome this problem, our invention contemplates the use of a jam nut carried by the ball joint housing and having a left-hand threaded co-action therewith. Thus, when the replacement ball joint is screwed into place on the control arm, the left-hand jam nut is taken up to bear against the arm. Accordingly, should there be any slight rotation of the ball joint housing with respect to the arm due to looseness, vibration, shock, and the like, any rotation tending to unscrew the right-hand thread connection will necessarily tighten up the jam nut against the arm due to the left-hand thread co-action. This presupposes, of course, that the jam nut is initially engaging the arm so that it is maintained frictionally against rotation.

An additional construction of the invention takes advantage of the jam nut in that it is provided with an exteriorly curved or spherical contour to serve as a base for a metallic cup dust shield having a complementary spherical interior contour. Thus, such a dust shield cup can rock sealingly on the jam nut with the twisting and straining of the ball joint. The entire dust shield means contemplates the use of a second cup, likewise of a spherical shape, sealingly contiguous with rocking engagement on the first cup so that the combination of the two cups provides complete flexibility as the ball joint stud rocks within its housing and maintains an enclosure of the stud where it enters the housing, at all times. A sealing means, comprising a suitable washer is utilized on the stud in abutment with an aperture in the second cup through which the stud passes to effectively seal the stud with respect to the articulated bell cups.

A detailed description of the invention will now be given in conjunction with the appended drawings, in which:

FIG. 1 is an elevation partially in section showing a pair of ball joints intermediate the control arms and the steering knuckle of an automotive front suspension.

FIG. 2 is a section in detail of one of the ball joints.

Referring now to the drawing, a pair of ball joints 10 is shown in FIG. 1, which are substantially identical except for the type of Alemite fittings 12 and 14 used with the respective joints in order to provide lubrication for the upper and lower joints, all as well understood in the art.

Thus, it will be noted that the upper and lower ball joints are connected, respectively, to the upper and lower arms of a steering knuckle 16 and are also connected to respective upper and lower control arms 18 and 20. A detailed description of only one ball joint is necessary in view of their identical construction; accordingly, referring to FIG. 2, in particular, the ball joint comprises a housing 24 from which extends a stud 27 through an aperture 30. The interior construction of the ball joint is more or less conventional and comprises the ball member 33 having a spherical surface in contiguous, rockable engagement with a complementary, spherical surface of the housing, as shown, and wherein the stud 27 passes through the ball 33 and terminates in a head 36 against which a friction plate 39, biased by a spring 40, is pressed. The housing is closed by a cover plate 41, as shown, all being of conventional construction and assembly. Such arrangement and co-action of elements in a ball joint have heretofore been known and no claim is made herein thereto.

The invention resides in the provision of a right-hand threaded section 43 in conjunction with a left-hand threaded seciton 46 on the exterior of the housing 24. Thus, referring to FIG. 1, it will be noted that the section 43 has been threaded into an aperture 48 provided in the control arm and it will be understood that the ball joint is a replacement ball joint and that the aperture 48 has previously been cut with a right-hand thread by the ball joint being replaced. The housing, of course, is socketed in the aperture 48 to the extent permitted by a flange 52 in accordance with usual practice.

The left-hand threaded section 46 of the ball joint housing 24 carries a left-hand threaded jam nut 55 which is taken up sufficiently so as to abut tightly against a supporting member such as the control arm. It will now be appreciated that any tendency of the housing to rotate in a direction which might cause it to back out of the housing arm would necessarily cause jam nut 55 to tighten against the arm, since a loosening rotation of the housing, insofar as right-hand threads are concerned, would effect a tightened rotation insofar as left-hand threads are concerned. Therefore, the left-hand thread co-action of the jam nut, remaining relatively stationary by virtue of frictional engagement with the arm, prevents loosening rotation of the housing. Accordingly, a replacement ball joint utilizing such feature can be expected to stay in place on the lower control arm despite the fact that it did not have the advantage of cutting its own threads in the aperure of such arm, but had to be inserted in threads previously cut by the replaced ball joint housing.

A further feature, as hereinabove mentioned, of our invention, resides in utilizing the jam nut as a base for a dust shield. Thus, an articulated dust shield comprising a pair of metallic cups of generally spherical shape, comprising an inner cup or bell 60 and an outer cup or bell 63, is utilized. The cup 60 has an interior contour complementary to the contour of the jam nut so that it can rotate therearound to a suitable degree in any direction. Similarly, the outer cup 63 has universally movable engagement wtih the inner cup 60. The engagement surfaces between cup 60 and the jam nut and cup 63 and cup 60 are sufficiently smooth so as to permit easy sliding in any direction, while, at the same time, excluding dust from entering between the contiguous surfaces. Finally, a seal means, such as a friction washer 66, surounds the stud and abuts intermediate aperture 70 in cup 63 through which the stud extends, and the arm of the steering knuckle, as shown in FIG. 1. Thus, sealing washer 66, which may be of any suitable conventional material effectively prevents entry of dust intermediate the stud and cup 63.

The take-up of stud 36 via castellated nut 74 is such as to suitably compress washer 66 against the dome of cup 63, the parts being so dimensioned that at the limit of take-up, as effected by the usual taper at the mid-section of the stud, as shown in FIG. 1, sufficient compression of washer 66 is effected to provide practical sealing effect. Thus, the dust shield means contemplates a construction wherein an intermediate cup, such as 60, can be considered a floating cup in that it is not attached to any other part of the construcion, whereas the jam nut 55, serving as part of the dust shield configuration, moves with the ball housing, and the bell 63 moves with the stud. Thus, the articulated combination permits great angular distortion and displacement between the stud and the housing without, however, straining the dust shield means in any way, due to the intermediate floating cup 60.

Having thus described our invention, we are aware that various changes may be made without departing from the spirit thereof, and, therefore, we do not desire to be limited to the precise illustration herein given except as set forth in the appended claims.

We claim:
1. A ball joint comprising a housing having a threaded section carrying a jam nut, a stud extending outwardly of said housing through said jam nut, including a dust shield means disposed to sealingly engage said jam nut and to have relative sliding movement with respect thereto, said stud extending sealingly through said dust shield means, said jam nut having a spherically contoured outer surface, said dust shield means comprising an element having a complementary, internally contoured spherical surface, said surfaces being engageable with each other and having relative rocking motion with respect to each other.

2. A ball joint as set forth in claim 1, said dust shield means including a second element sealingly engaging said first-mentioned element and having relative rocking movement with respect thereto, and means for effecting a seal between said second element and said stud.

3. A ball joint comprising a housing having a stud retained therein and extending therefrom and means in said housing for effecting relative movement of said stud with respect to said housing, means for effecting a curved surface on an exterior portion of said housing, a dust shield means surrounding said stud and comprising a pair of telescoped metallic bells having complementary, curved surfaces and being disposed in rockable engagement with each other, and means effecting a seal between one of said bells and said stud, wherein said means for effecting a curved surface comprises a jam nut threadedly carried on said housing with a left-hand thread, said housing having a section provided with a right-hand thread for fastening said ball joint to a carrying member.

4. A ball joint to be carried on a supporting arm, comprising a housing having a stud retained therein and extending therefrom and means in said housing for effecting relative movement of said stud with respect to said housing, a jam nut threadedly carried on said housing and being engageable with said arm for securing said housing to said arm and having a curved exterior surface, a dust shield means surrounding said stud and comprising a pair of telescoped bells having nested, curved surfaces and being disposed in rockable engagement with each other, one of said bells being pivotally and sealingly engageable with said curved surface of said jam nut.

5. A ball joint to be carried on a supporting arm, comprising a housing having a stud retained therein and extending therefrom and means in said housing for effecting relative movement of said stud with respect to said housing, a jam nut threadedly carried on said housing and being engageable with said arm for securing said housing to said arm and having a curved exterior surface, a dust shield means surounding said stud and comprising bell means carried on said stud and having a concave surface in rockable sealing engagement with the curved surface of said jam nut.

References Cited in the file of this patent

UNITED STATES PATENTS

| | | |
|---|---|---|
| 1,898,334 | Baker | Feb. 21, 1933 |
| 2,266,758 | Holtz | Dec. 23, 1941 |
| 2,819,918 | Seaquist | Jan. 14, 1958 |
| 2,835,521 | White | May 20, 1958 |
| 2,848,260 | Moskovitz | Aug. 19, 1958 |
| 2,876,030 | Booth | Mar. 3, 1959 |
| 2,936,188 | Moskovitz | May 10, 1960 |

FOREIGN PATENTS

| | | |
|---|---|---|
| 134,709 | Great Britain | Nov. 13, 1919 |
| 1,233,904 | France | May 9, 1960 |